US010604984B2

(12) United States Patent
Schatz et al.

(10) Patent No.: US 10,604,984 B2
(45) Date of Patent: Mar. 31, 2020

(54) VEHICLE SLIDING CLOSURE NON-CONTACT OBSTACLE DETECTION SYSTEM

(71) Applicant: Magna Closures Inc., Newmarket (CA)

(72) Inventors: Kurt M. Schatz, Uxbridge (CA); Samuel R. Baruco, Aurora (CA); Stephen James Caron, Aurora (CA)

(73) Assignee: MAGNA CLOSURES, INC., Newmarket (CA)

( * ) Notice: Subject to any disclaimer, the term of this patent is extended or adjusted under 35 U.S.C. 154(b) by 87 days.

(21) Appl. No.: 15/896,402

(22) Filed: Feb. 14, 2018

(65) Prior Publication Data

US 2018/0238094 A1 Aug. 23, 2018

Related U.S. Application Data

(60) Provisional application No. 62/460,138, filed on Feb. 17, 2017.

(51) Int. Cl.
*E05F 15/43* (2015.01)
*G06F 19/00* (2018.01)

(52) U.S. Cl.
CPC ...... *E05F 15/431* (2015.01); *E05F 2015/436* (2015.01); *E05Y 2900/55* (2013.01)

(58) Field of Classification Search
CPC ... E05F 15/431; E05F 15/43; E05F 2015/436; E05F 15/20; E05Y 2900/55
USPC .......................................................... 701/49
See application file for complete search history.

(56) References Cited

U.S. PATENT DOCUMENTS 4,706,227 A * 11/1987 DuVall .................... B66B 13/26 187/317
5,410,227 A * 4/1995 Toyozumi ............... G01S 15/04 318/283
5,596,840 A * 1/1997 Teich ...................... E05F 15/43 49/26
5,996,281 A * 12/1999 Takano .................... G01V 8/14 49/26
6,088,641 A * 7/2000 Bushmann ............ E05F 15/431 318/286
6,218,940 B1 * 4/2001 Rejc .......................... E06B 9/82 340/556
6,304,178 B1 * 10/2001 Hayashida ............... G01V 8/10 340/545.1
6,701,673 B1 * 3/2004 Kessler ..................... F16P 3/12 49/28

(Continued)

*Primary Examiner* — Tan Q Nguyen
(74) *Attorney, Agent, or Firm* — Dickinson Wright PLLC

(57) ABSTRACT

A non-contact obstacle detection (NCOD) system for an opening in a vehicle includes a cover panel, such as a glass pane, slidable between opened and closed positions within the opening. The system includes one or more infrared time-of-flight (IR-TOF) sensors which measure the length of a beam of infrared light by measuring the time that the infrared light in the beam takes to travel the length of the beam and to reflect back to the sensor. The IR-TOF sensors may be configured to provide a beam of light along either the side edge of the frame parallel to the sliding direction or a terminal edge generally transverse to the sliding direction. Methods are provided for detecting obstacles within the opening of the frame by controllers using the lengths of beams from each of those different beam configurations, and for self-calibrating the system.

20 Claims, 7 Drawing Sheets

(56) References Cited

U.S. PATENT DOCUMENTS

| | | | | |
|---|---|---|---|---|
| 6,936,984 | B2 * | 8/2005 | Wilson | G05B 19/00<br>318/264 |
| 7,045,764 | B2 * | 5/2006 | Beggs | E06B 9/13<br>250/221 |
| 9,267,318 | B2 * | 2/2016 | Ersek | G05B 19/4062 |

* cited by examiner

VEHICLE SLIDING CLOSURE NON-CONTACT OBSTACLE DETECTION SYSTEM

CROSS REFERENCE TO RELATED APPLICATION

This Utility Patent Application claims the benefit of U.S. Provisional Patent Application Ser. No. 62/460,138 filed Feb. 17, 2017 entitled "VEHICLE SLIDING GLASS NON-CONTACT OBSTACLE DETECTION SYSTEM FOR MOTOR VEHICLES" which is hereby incorporated by reference in its entirety.

FIELD OF THE INVENTION

The present disclosure relates generally to a non-contact obstacle detection system for an opening of a motor vehicle and method of operating the non-contact obstacle detection system.

BACKGROUND OF THE INVENTION

This section provides background information related to the present disclosure which is not necessarily prior art.

Motor vehicles are increasingly being equipped with cover panels, such as windows, which have having closing devices configured as automatic or semi-automatic devices to close the window without requiring a user to hold a switch throughout the closing process. Such cover panels are commonly equipped with obstacle detection systems to prevent the closing devices from causing the cover panels to close on an obstacle such as a body part extending through the open window frame. Most obstacle detection systems in use today are contact-type systems, which rely on contact between the window and the obstacle before the obstacle can be detected. Contact-type obstacle detection systems have inherent drawbacks in that they can only detect obstacles which contact the moving window pane, oftentimes only when the obstacle prevents the cover panels from moving, after some pinching force is applied to the obstacle.

Thus, there is an increasing need for a non-contact obstacle detection system that prevents the cover panel from colliding with an obstacle while the cover panel is closing. Furthermore, other desirable features and characteristics of the present invention will become apparent from the subsequent detailed description and the appended claims, taken in conjunction with the accompanying drawings and the foregoing technical field and background.

SUMMARY OF THE INVENTION

This section provides a general summary of the present disclosure and is not intended to be interpreted as a comprehensive disclosure of its full scope or all of its features, aspects and objectives.

A non-contact obstacle detection system for detecting an obstacle within the opening of a frame for a sliding cover panel of a motor vehicle is generally shown in FIGS. 1C-1D. The frame defines an opening including a first side edge generally parallel to the sliding direction and a terminal edge generally transverse to the sliding direction. The cover panel includes a leading edge which abuts the terminal edge of the frame with the cover panel in the closed position, and with the cover panel completely enclosing the opening in the frame. The cover panel is spaced apart from the terminal edge in the open position.

A first IR-TOF sensor is disposed within the frame adjacent to the terminal edge and providing a first beam within the frame along and adjacent to the first edge and reflecting from the leading edge of the cover panel for detecting an obstacle within the opening as the cover panel is moved toward the closed position. The first IR-TOF sensor is configured to detect an obstacle within the opening by sensing an actual length of the first beam.

As illustrated in FIG. 3, a method of operating a non-contact obstacle detection system for a sliding glass window having a closing device is disclosed. The method includes detecting the cover panel closing. The method also includes generating a first beam parallel to the sliding direction along and adjacent to a first side edge of the frame by a first IR-TOF sensor. The method also includes reflecting the first beam off a leading edge of the cover panel and back to the first IR-TOF sensor. The method also includes measuring a length of the first beam across the first side edge by the first IR-TOF sensor. The method also includes detecting an obstacle within the opening based upon the actual length of the first beam as measured by the first IR-TOF sensor.

These and other aspects and areas of applicability will become apparent from the description provided herein. The description and specific examples in this summary are intended for purpose of illustration only and are not intended to limit the scope of the present disclosure.

BRIEF DESCRIPTION OF THE DRAWINGS

The drawings described herein are for illustrative purposes only of selected embodiments and not all implementations, and are not intended to limit the present disclosure to only that actually shown. With this in mind, various features and advantages of example embodiments of the present disclosure will become apparent from the following written description when considered in combination with the appended drawings, in which.

DETAILED DESCRIPTION

Figure 1A:
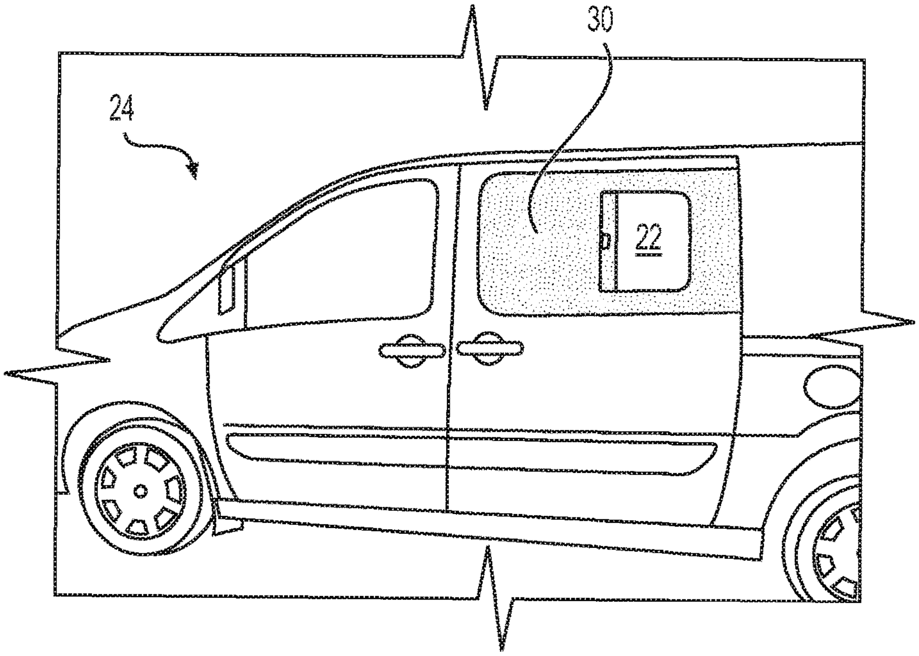
FIGS. 1A, 1B, 1C, and 1D are side views of a cover plate that is a sliding glass window in a vehicle equipped with a non-contact obstacle detection system according to aspects of the disclosure.

In the following description, details are set forth to provide an understanding of the present disclosure. In some instances, certain circuits, structures and techniques have not been described or shown in detail in order not to obscure the disclosure.

In general, the present disclosure relates to an obstacle detection system 20 well-suited for use in many applications. More specifically, a non-contact obstacle detection system 20 for detecting an obstacle within the opening 22 of a frame 30 for a sliding cover panel 26 of a motor vehicle 24 is disclosed and method of operating the non-contact obstacle detection system 20 is disclosed herein. In response to the detection of an obstacle, the system may take some action such as, for example, signaling a closing device to stop closing the window, and/or triggering a warning to users. The non-contact obstacle detection system 20 of this disclosure will be described in conjunction with one or more example embodiments. However, the specific example embodiments disclosed are merely provided to describe the inventive concepts, features, advantages and objectives with sufficient clarity to permit those skilled in this art to understand and practice the disclosure.

Referring to the Figures, wherein like numerals indicate corresponding parts throughout the several views, a non-contact obstacle detection system 20 for an opening 22 in a vehicle 24 is disclosed. As best shown in FIGS. 1A-1D, the non-contact obstacle detection system 20 includes a sliding cover panel 26 which is slidable within a frame 30 in a sliding direction 28 from an open position to a closed position. The cover panel 26 is illustrated as a window including a pane of glass. The frame 30 defines an opening 22 between two side edges 32, 34 each generally parallel to the sliding direction 28 and a terminal edge 36 generally transverse to the sliding direction 28. While the frame 30 is illustratively described herein as being a defined by a vehicle side window composed of glass, the frame 30 could also include vehicle or door frame structural elements composed of metal, as well as vehicle roof structural panels, rear liftgate panels and members and the like. All or part of the terminal edge 36 may be curved or bent such as, for example, the top edge of a window opening in a typical front car door. The cover panel 26 includes a leading edge 40 which abuts the terminal edge 36 of the frame 30 with the cover panel 26 in the closed position, and with the cover panel 26 completely enclosing or covering the opening 22 in the frame 30. The cover panel 26 is spaced apart from the terminal edge 36 in the open position. In other words, the cover panel 26 retracts away from the terminal edge 36 as it is opened.

The cover panel 26 may comprise, for example, traditional glass, or any other transparent or translucent material capable of forming a rigid panel, such as Lexan or a composite or combination of multiple materials together. The cover panel 26 may also be a partially or fully opaque structure such as a sunshade or a metal panel.

The non-contact obstacle detection system 20 may use one or more infrared time-of-flight (IR-TOF) sensors 42, 46, 50, which measure the length of a beam of infrared light by measuring the time that the infrared light in the beam takes to travel the length of the beam and to reflect back to the sensor.

Figure 1B:
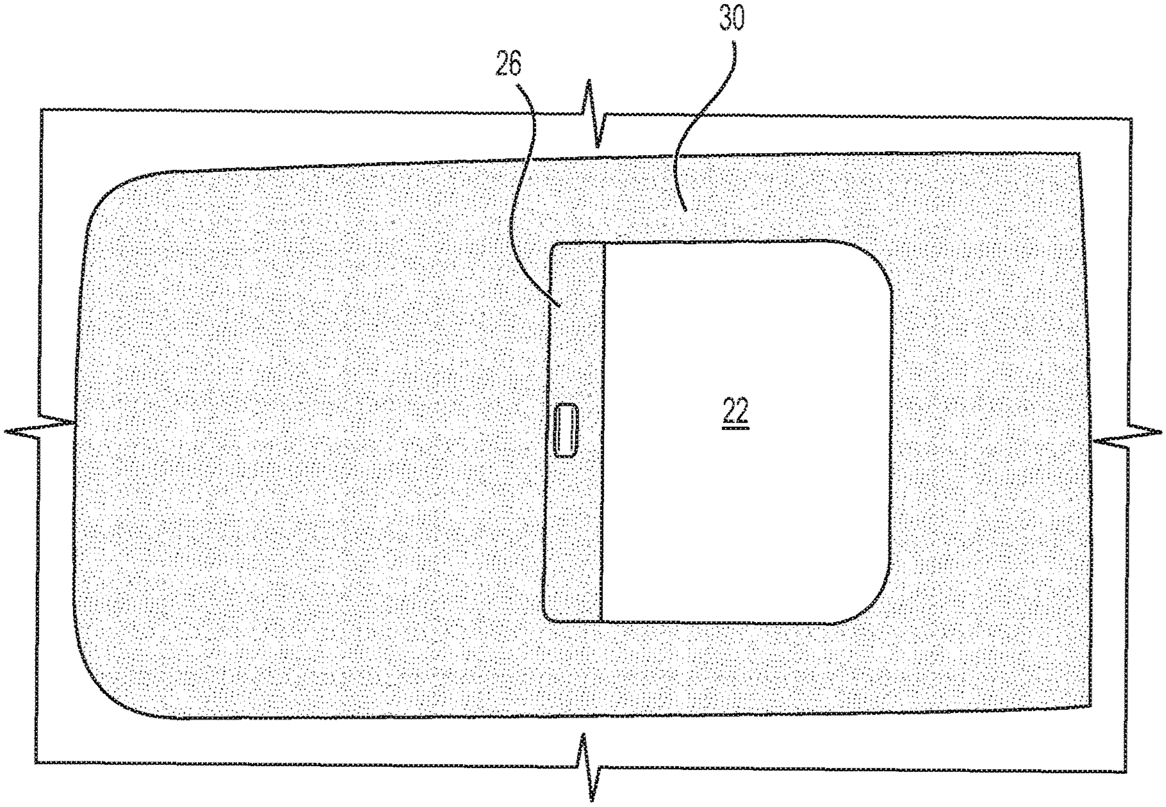
Figure 1C:
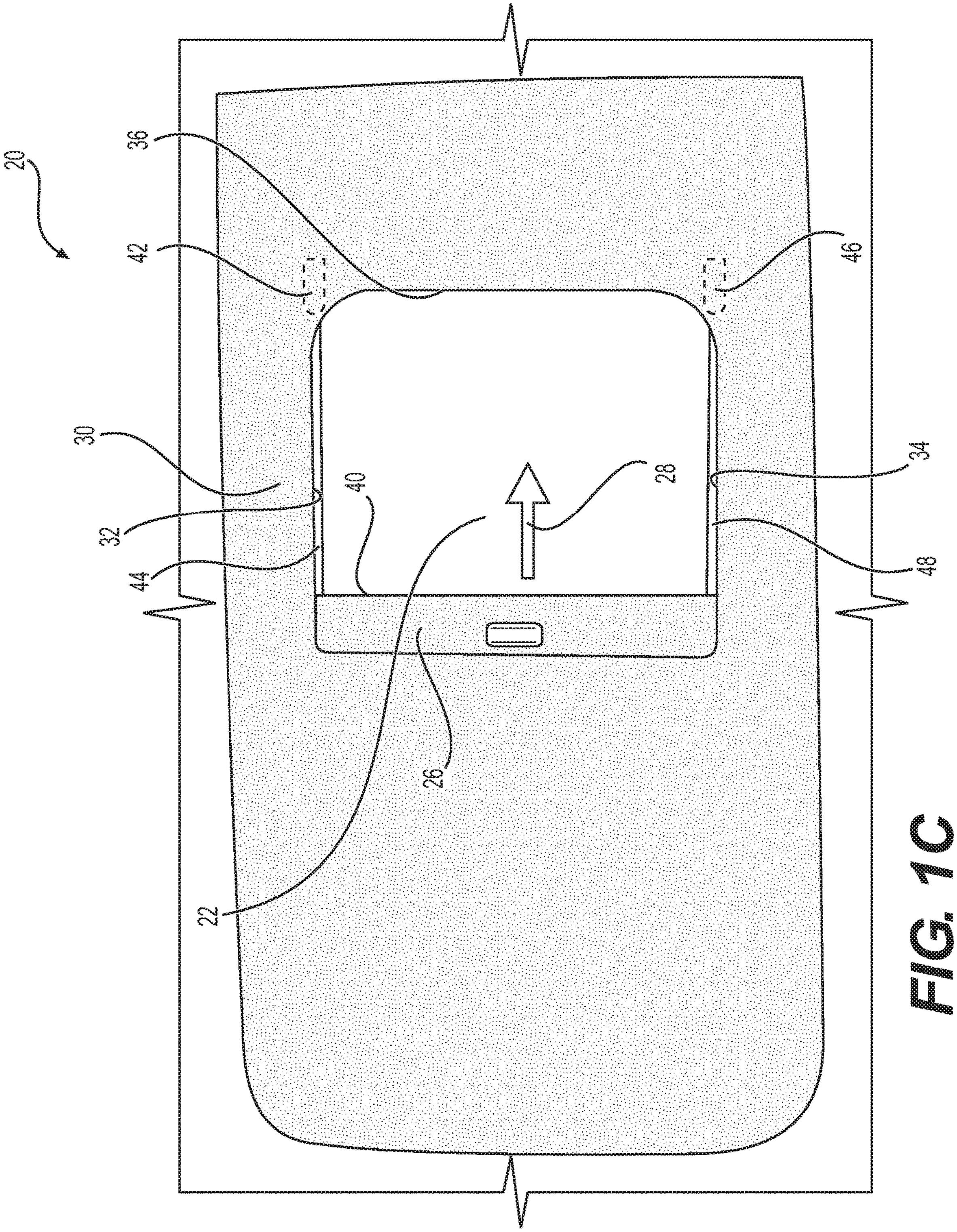

As shown in FIGS. 1A-1C, a first IR-TOF sensor 42 is disposed within the frame 30 adjacent to the terminal edge 36 and providing a first beam 44 within the frame 30 along and adjacent to the first edge and reflecting from the leading edge 40 of the cover panel 26 for detecting an obstacle within the opening 22 as the cover panel 26 is moved toward the closed position.

Figure 2:
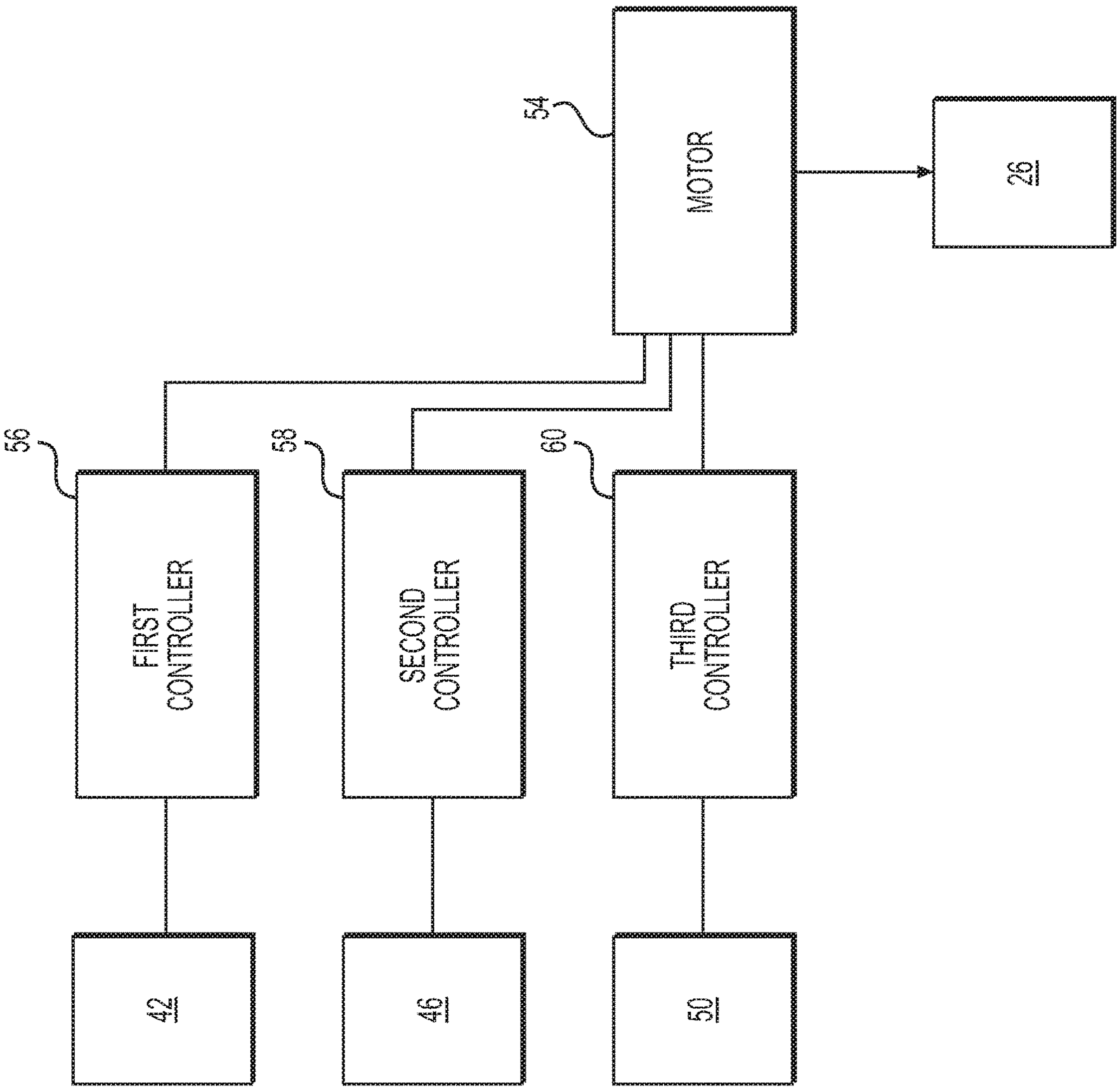
FIG. 2 is a block diagram illustrating a non-contact obstacle detection system.

As shown in the block diagram of FIG. 2, an actuator 54, such as a motor, is connected to the cover panel 26 for moving the cover panel 26. A first controller 56 is in communication with the first IR-TOF sensor 42; a second controller 58 is in communication with the second IR-TOF sensor 46; and a third controller 60 is in communication with the third IR-TOF sensor 60. Each of the controllers 56, 58, 60 are in communication with the actuator 54 to monitor its operation and to prevent the actuator 54 from continuing to move the cover panel 26 in response to the detection of an obstacle within the frame 30 with the cover panel 26 being closed.

The first controller 56 is configured to detect an obstacle within the opening 22 by sensing an actual length of the first beam 44 as measured by the first IR-TOF sensor 42. The actual length of the first beam 44 is twice the distance between the first sensor 42 and the cover panel 26, as the first beam 44 travels from the first sensor, off of the leading edge 40 of the cover panel 26, and back to the first sensor 42.

According to a first aspect, the first controller 56 may detect an obstacle within the opening 22 by sensing the actual length of the first beam 44 which is shorter than an expected length of the first beam 44. The expected length of the first beam 44 may be determined based on an initial position of the cover panel 26 and an expected position resulting from a nominal speed of the cover panel 26 times the amount of time that the cover panel 26 is moved toward the closed position. In other words, the first controller 56 may detect an obstacle within the opening 22 by sensing the first beam 44 being shorter than expected as result of the first beam 44 reflecting off of an obstacle instead of the leading edge 40 of the cover panel 26. Also, an obstacle that blocks the first beam 44 and prevents reflection from the terminal edge 36 of the cover panel 26 may be detected by the first IR-TOF sensor 42.

According to a second aspect, which may be used in addition to or instead of the first aspect, the first controller 56 may use the closing velocity of the cover panel 26 to detect an obstacle within the opening 22. The first controller 56 may be configured to calculate an actual closing velocity of the cover panel 26 as a rate of change of the first beam 44 over time.

The first controller 56 may be configured to detect the obstacle within the opening 22 by sensing the actual closing velocity being less than a predetermined closing velocity. The predetermined closing velocity may be chosen to be just less than a slowest expected closing velocity of the cover panel 26. The predetermined closing velocity preferably corresponds to an expected closing speed of the cover panel 26 such as, for example, 5 centimeters per second, and may include some safety factor to account for errors in the measurement, and/or abnormally fast moving of the cover panel 26. For example, cover panel 26 having a slowest expected closing velocity of 5 centimeters per second may have a predetermined closing velocity of 4 centimeters per second. An actual closing velocity of the cover panel 26 of less than 4 centimeters per second would then be detected by the first controller 56 as indicating an obstacle within the opening 22 that caused the cover panel 26 to be slowed below the predetermined closing velocity of 4 centimeters per second. In other words, the first IR-TOF sensor 42 may detect the obstacle within the opening 22 by the first beam 44 being shortened in a way that is inconsistent with the normal, unobstructed closing motion of the cover panel 26.

Alternatively or additionally, the first controller 56 may be configured to detect the obstacle within the opening 22 by sensing a reduction in the actual closing velocity prior to the cover panel 26 being in the closed position. For example, a cover panel 26 that is moving at an actual closing velocity of 5 centimeters per second, and which suddenly slows to an actual closing velocity of 3 centimeters per second would be detected by the first controller 56 as indicating an obstacle within the opening 22 that caused the cover panel 26 to be slowed. The expected closing speed may also be provided, as a stored profile which may vary over the time or position of the closing of the window. In other words, the first controller 56 may sense an obstacle within the opening 22 and which interferes with the normal closing of the cover panel 26 by detecting an abnormally slowly closing of the cover panel 26.

Alternatively, or additionally, the first controller 56 may be configured to detect an obstacle within the opening 22 by sensing the actual closing velocity of the cover panel 26 being greater than an interruption velocity indicative of a sudden change in the actual length of the first beam 44 caused by the insertion of the obstacle between the first IR-TOF sensor 42 and the cover panel 26. For example, a cover panel 26 that is typically moved by the actuator 54 at a maximum closing velocity of 6 centimeters per second, may have an interruption velocity of 10 centimeters per second. The first controller 56 would interpret the detection of a closing velocity greater than the interruption velocity of 10 centimeters per second as indicating an obstacle within the opening 22.

As shown in FIGS. 1A-1C, a second IR-TOF sensor 46 is disposed within the frame 30 and provides a second beam 48 along and adjacent to the second side edge 34 and reflecting from the leading edge 40 of the cover panel 26 for detecting an obstacle within the opening 22 as the cover panel 26 is moved toward the closed position.

The second controller 58 may be similar or identical to the first controller 56. The second controller 58 may alternatively be the same physical device as the first controller 56. Like the first controller 56, the second controller 58 is configured to detect an obstacle within the opening 22 by sensing an actual length of the second beam 48 as measured by the second IR-TOF sensor 46. The actual length of the second beam 48 is twice the distance between the second sensor and the cover panel 26, as the second beam 48 travels from the first sensor, off of the leading edge 40 of the cover panel 26, and back to the first sensor. The second IR-TOF sensor 46 may be used independently or in conjunction with the first IR-TOF sensor 42.

Similarly to the first aspect discussed above with reference to the first IR-TOF sensor 42, the second controller 58 may detect an obstacle within the opening 22 by sensing the actual length of the second beam 48 which is shorter than an expected length of the second beam 48. The expected length of the second beam 48 may be determined based on an initial position of the cover panel 26 and an expected position resulting from a nominal speed of the cover panel 26 times the amount of time that the cover panel 26 is moved toward the closed position. Also, an obstacle that blocks the second beam 48 and prevents reflection from the terminal edge 36 of the cover panel 26 may be detected by the second IR-TOF sensor 46.

Similarly to the first aspect discussed above with reference to the first controller 58, the second controller 58 may detect an obstacle within the opening 22 by sensing the actual length of the second beam 48 which is shorter than an expected length of the second beam 48. In other words, the second controller 58 may detect an obstacle within the opening 22 by sensing the second beam 48 being shorter than expected as result of the second beam 48 reflecting off of an obstacle instead of the leading edge 40 of the cover panel 26.

Similarly to the second aspect discussed above with reference to the first controller 58, the second controller 58 may detect an obstacle within the opening 22 by sensing the actual closing velocity being less than a predetermined closing velocity. In other words, the second IR-TOF sensor 46 may detect the obstacle within the opening 22 by the second beam 48 being shortened in a way that is inconsistent with the normal, unobstructed closing motion of the cover panel 26.

Alternatively or additionally, the second controller 58 may be configured to detect the obstacle within the opening 22 by sensing a reduction in the actual closing velocity prior to the cover panel 26 being in the closed position. In other words, the second controller 58 may sense an obstacle within the opening 22 and which interferes with the normal closing of the cover panel 26 by detecting an abnormally slowly closing of the cover panel 26.

Alternatively, or additionally, the second controller 58 may be configured to detect an obstacle within the opening 22 by sensing the actual closing velocity of the cover panel 26 being greater than an interruption velocity indicative of a sudden change in the actual length of the second beam 48 caused by the insertion of the obstacle between the second IR-TOF sensor 46 and the cover panel 26. In keeping with the example interruption velocity of 10 centimeters per second discussed above, the second controller 58 may also interpret the detection of a closing velocity greater than the interruption velocity of 10 centimeters per second as indicating an obstacle within the opening 22.

Figure 1D:
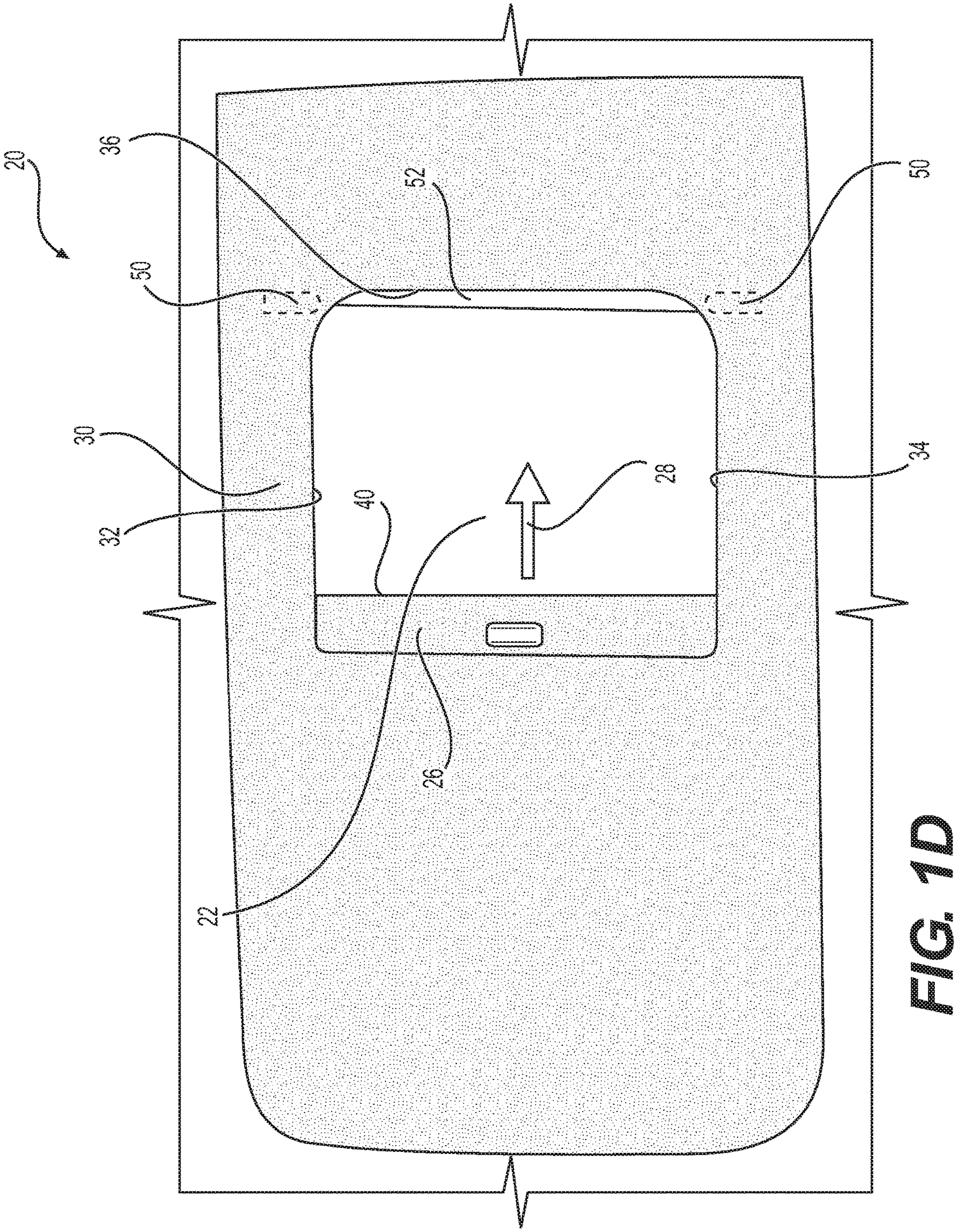

As shown in FIG. 1D, a third IR-TOF sensor 50 is disposed adjacent the terminal edge 36 of the frame 30 and providing a third beam 52 within the frame 30 along and adjacent to the terminal edge 36 for detecting an obstacle within the opening 22 as the cover panel 26 is moved toward the closed position.

The third controller 60 may be similar or identical to the first controller 56 and/or the second controller 58. The third controller 60 may alternatively be the same physical device as one or both of the first controller 56 and/or the second controller 58. The third controller 60 is configured to detect an obstacle within the opening 22 by sensing an actual length of the third beam 52 shorter than a predetermined length approximately equal to the length the terminal edge 36 and before the cover panel 26 is in a position to block the third beam 52. FIG. 1D shows the third IR-TOF sensor 50 as having two parts, with one at each end of the terminal edge 36 of the frame 30. Those two parts may be, for example, separate transmitter and receiver devices. The third IR-TOF sensor 50 may also be provided as a single component that detects the third beam 52 reflecting back from a reflective surface at the opposite end of the terminal edge 36.

The obstacle detection system 20 may also include a contact-type obstacle detection device for detecting an obstacle within the opening 22 as the cover panel 26 is moved toward the closed position. Such a contact-type obstacle detection device may serve as a backup for the IR-TOF sensors 42, 46, 50 or as a redundant safety measure to ensure that an obstruction such as a body part is not pinched by the closing cover panel 26. A contact-type obstacle detection device may include a switch or pad within the frame 30 for detecting physical contact. A contact-type obstacle detection device may alternatively or additionally be implemented by monitoring a motor or other device attached to the cover panel 26 to detect a slowing or an increase in force required to move the cover panel 26, which would indicate an obstruction.

In any configuration, the presence of an obstruction in the path of one of the beams 44, 48, 52 may be detected by the system as an obstacle. In response to the detection of an obstacle, the system may take some action such as signaling a closing device to stop closing the window.

Although horizontally sliding glass is depicted in FIGS. 1A-1D, the system may be used with other configurations as well, including, for example, vertically sliding glass and/or glass slidable in a generally horizontal plane, such as with a sunroof or a retractable roof panel.

Clearly, changes may be made to what is described and illustrated herein without, however, departing from the scope defined in the accompanying claims. The non-contact obstacle detection system 20 may operate with myriad combinations of various types of non-contact sensors and for any vehicle 24 closure members of the motor vehicle 24, for example.

One or more of the controllers 56, 58, 60 may be partially or entirely integrated with one or more of the sensors 42, 46, 50. One or more of the controllers may be distributed between two or more physical devices, which may include one or more of the sensors 42, 46, 50. For example, the sensors 42, 46, 50 may include some processing capability to generate and transmit the velocity of the cover panel 26 to one or more secondary processors which may use the velocity of the cover panel 26 to a determine whether an obstacle is present within the opening 22 and to signal the actuator 54 to stop closing in response thereto. Each of the controllers 56, 58, 60 may include a processor and a machine readable storage medium such as flash and/or DRAM computer memory, to determine the presence of an obstacle within the frame 30 based on the actual lengths of one or more of the beams 44, 48, 52 as measured by corresponding ones of the sensors 42, 46, 50.

Figure 3:
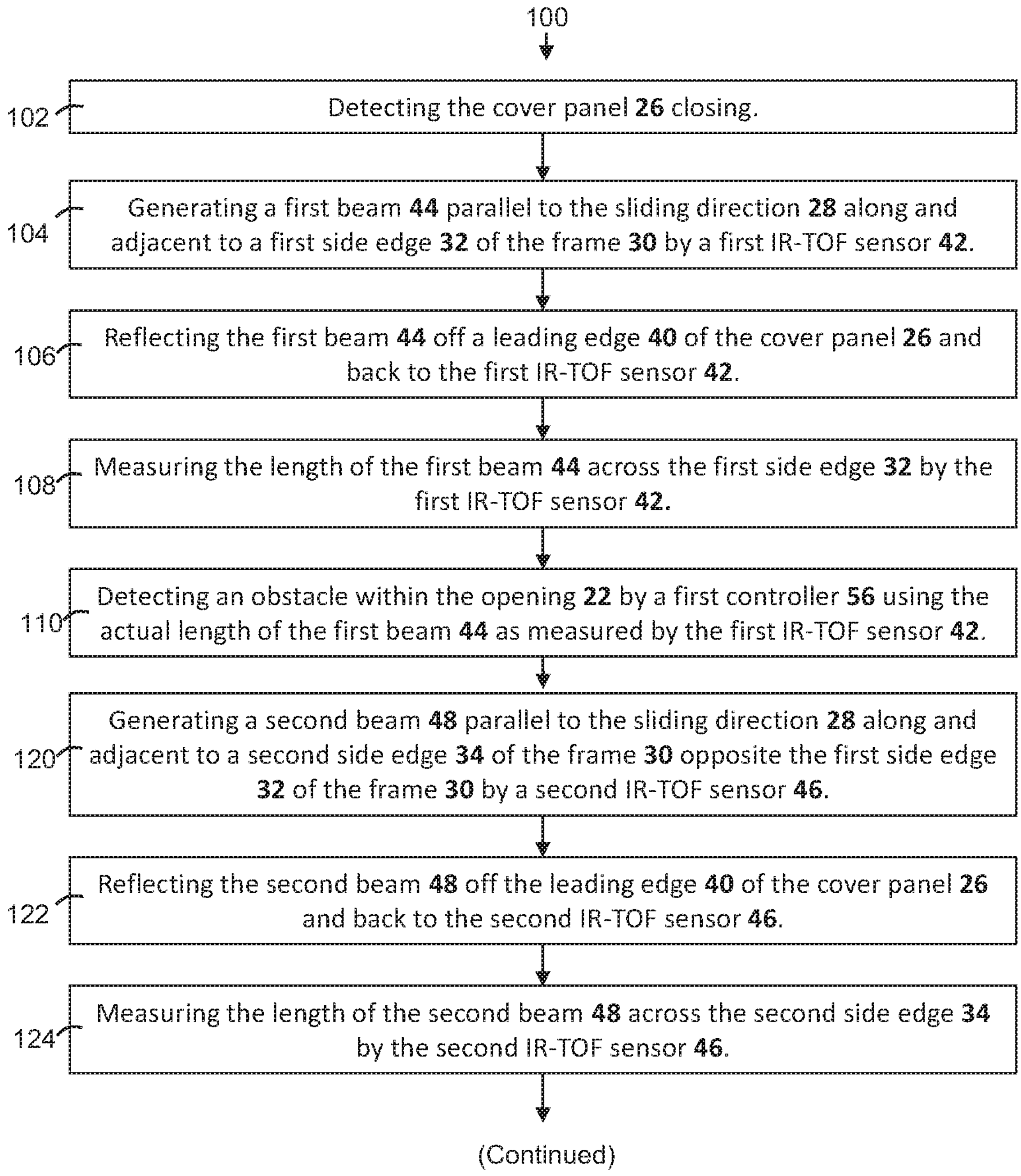
FIG. 3 is a flow chart illustrating a method of operating a non-contact obstacle detection system.

As illustrated in FIG. 3, a method 100 of operating a non-contact obstacle detection system 20 for a sliding glass window having a closing device is disclosed. The method 100 includes 102 detecting the cover panel 26 closing. This step may include monitoring an actuator 54, such as a motor, that is used for closing the cover panel 26 or by an interlock or other signal from a device (e.g. a hall sensor) in communication with the actuator 54 used for closing the cover panel 26. This step may be performed by one or more of the controllers 56, 58, 60.

The method 100 also includes 104 generating a first beam 44 parallel to the sliding direction 28 along and adjacent to a first side edge 32 of the frame 30 by a first IR-TOF sensor 42. The use and configuration of the first IR-TOF sensor 42 is described in paragraphs above and is illustrated in FIGS. 1A-1C.

The method 100 also includes 106 reflecting the first beam 44 off a leading edge 40 of the cover panel 26 and back to the first IR-TOF sensor 42.

The method 100 also includes 108 measuring a length of the first beam 44 across the first side edge 32 by the first IR-TOF sensor 42.

The method 100 also includes 110 detecting an obstacle within the opening 22 by a first controller 56 using the actual length of the first beam 44 as measured by the first IR-TOF sensor 42.

Figure 5:
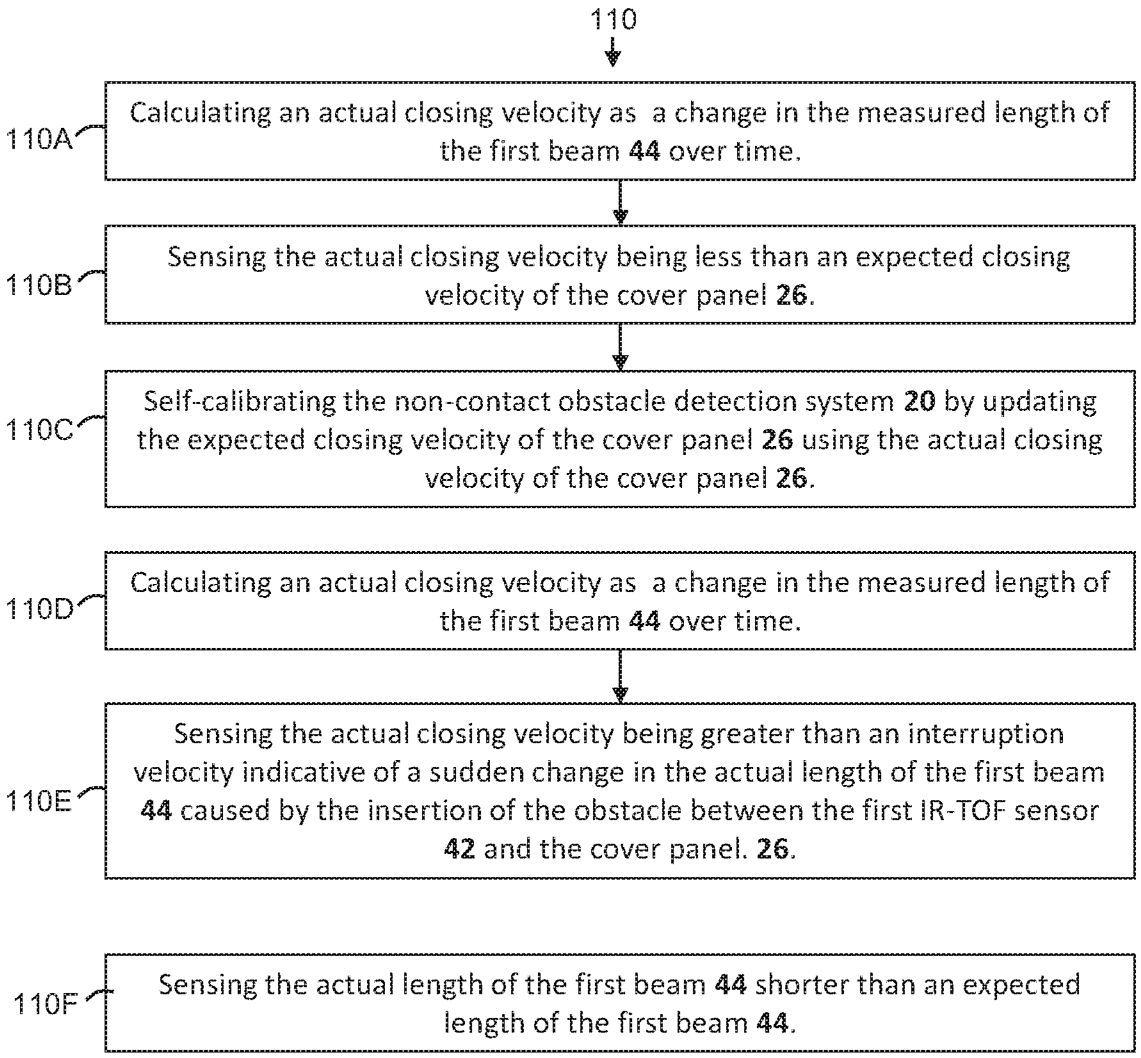
FIG. 5 is a block diagrams illustrating additional, alternative sub-steps in the method of operating a non-contact obstacle detection system of FIGS. 3-4.

According to an aspect, and as shown in FIG. 5, the step of 110 detecting an obstacle within the opening 22 based upon the actual length of the first beam 44 as measured by the first IR-TOF sensor 42 may further include the substep of 110A calculating an actual closing velocity as the measured length of the first beam 44 over time, and 110B detecting an actual closing velocity that is less than an expected closing velocity. These substeps 110A, and/or 110B may be performed by a first controller 56 in communication with the first IR-TOF sensor 42.

The expected closing velocity may be static and not varying. For example, the expected closing velocity may be factory set based on a nominal speed that the actuator 54 moves the cover panel 26 in the closing direction. Alternatively, the expected closing velocity may be changed. For example, step 110 may include the additional substep of 110C self-calibrating the non-contact obstacle detection system 20 by updating the expected closing velocity of the cover panel 26 using the actual closing velocity of the cover panel 26.

According to another aspect, and as shown in FIG. 5, the step of 110 detecting an obstacle within the opening 22 based upon the actual length of the first beam 44 may include the alternative sub-steps of 110D calculating an actual closing velocity as the measured length of the first beam 44 over time, and 110E detecting an obstacle within the opening 22 as a deviation between the actual closing velocity of the first closing velocity and the stored profile being above a threshold value. These substeps 110D, and/or 110E may be performed by the first controller 56 in communication with the first IR-TOF sensor 42.

According to another aspect, and as shown in FIG. 5, the step of 110 detecting an obstacle within the opening 22 based upon the actual length of the first beam 44 may include the alternative sub-step of 110F sensing the actual length of the first beam 44 shorter than an expected length of the first beam 44. The expected length of the first beam 44 may be determined, for example, based on an initial position and an expected position resulting from a nominal speed of the cover panel 26 times the amount of time that the cover panel 26 is moved toward the closed position.

As illustrated in FIG. 3, the method 100 also includes 120 detecting generating a second beam 48 parallel to the sliding direction 28 along and adjacent to a second side edge 34 of the frame 30 opposite the first side edge 32 of the frame 30 by a second IR-TOF sensor 46. The use and configuration of the second IR-TOF sensor 46 is described in paragraphs above and is illustrated in FIGS. 1C-1D.

The method 100 also includes 122 reflecting the second beam 48 off the leading edge 40 of the cover panel 26 and back to the second IR-TOF sensor 46. The method 100 also includes 124 measuring the length of the second beam 48 across the second side edge 34 by the second IR-TOF sensor 46. The method 100 also includes 126 detecting an obstacle within the opening 22 by a second controller 58 using the actual length of the second beam 48 as measured by the second IR-TOF sensor 46. The step of 126 detecting an obstacle within the opening 22 based upon the actual length of the second beam 48 may accomplished similarly to the step of 110 detecting an obstacle within the opening 22 based upon the actual length of the first beam 44 and may employ any or all of the substeps discussed above regarding using the first IR-TOF sensor 42 to detect an obstacle within the opening 22.

Figure 4:
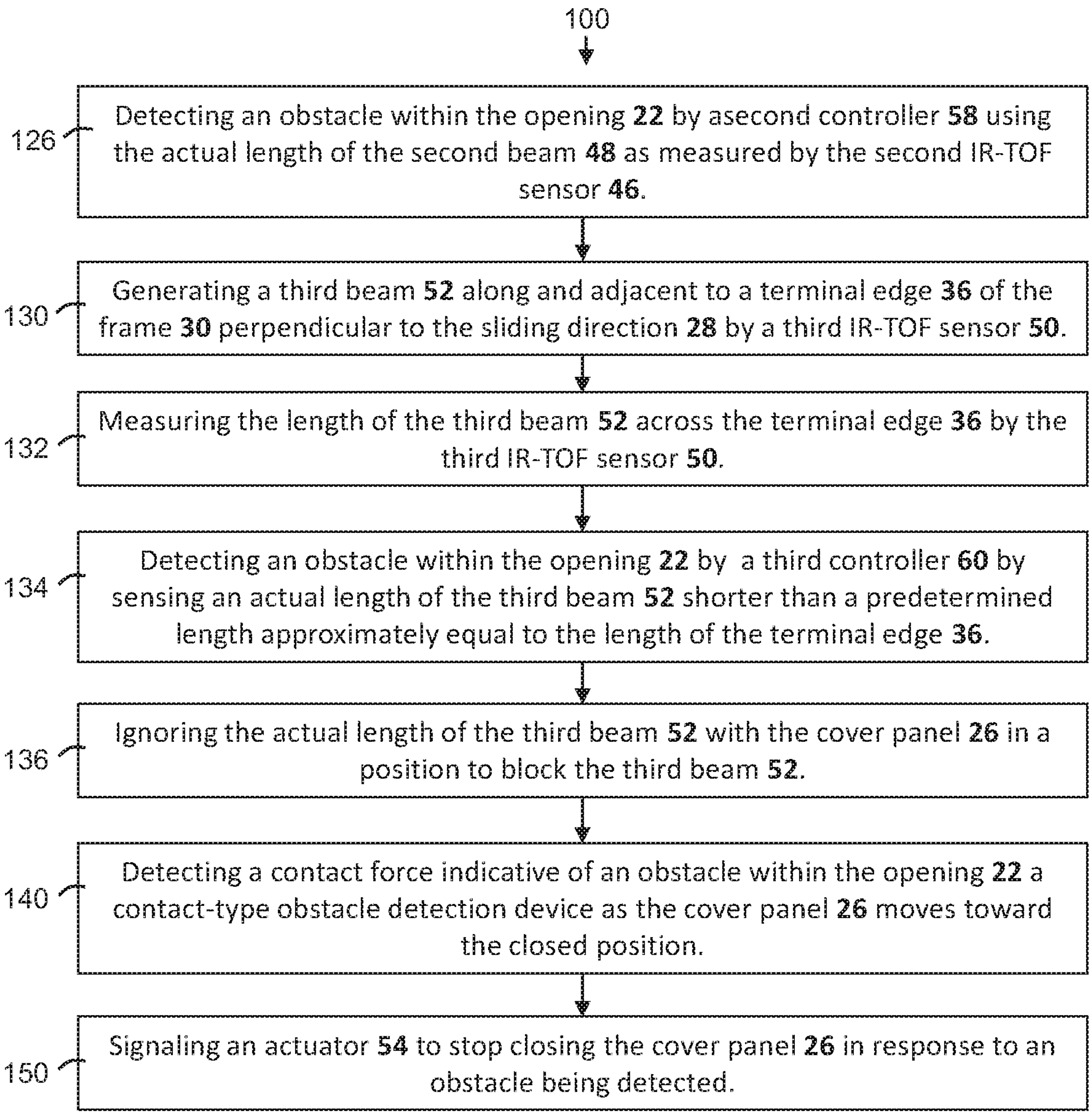
FIG. 4 is a continuation of the block diagram of FIG. 3 illustrating a method of operating a non-contact obstacle detection system.

As illustrated in FIG. 4, the method 100 also includes 130 generating a third beam 52 along and adjacent to a terminal edge 36 of the frame 30 perpendicular to the sliding direction 28 by a third IR-TOF sensor 50. The method 100 also includes 132 measuring the length of the third beam 52 across the terminal edge 36 by the third IR-TOF sensor 50. The method 100 also includes 134 detecting an obstacle within the opening 22 by a third controller 60 sensing an actual length of the third beam 52 shorter than a predetermined length approximately equal to the length of the terminal edge 36. The method 100 may also include 136 ignoring the actual length of the third beam 52 with the cover panel 26 in a position to block the third beam 52. This method step may not be necessary if the cover panel 26 does not physically block the third beam 52 (e.g. if the third beam 52 extends just within the cover panel 26 in the closed position).

The method 100 also includes 140 detecting a contact force indicative of an obstacle within the opening 22 a contact-type obstacle detection device as the cover panel 26 moves toward the closed position.

The method 100 also includes 150 signaling an actuator 54, such as a motor, to stop closing the cover panel 26 in response to an obstacle being detected. This step may be performed by one or more of the controllers 56, 58, 60, by a communication with the actuator 54. This step may also be performed by the contact-type obstacle detection device. This signaling may take the form of an electrical, mechanical or optical signal and/or may include actuating an interlock that physically, mechanically, and/or electrically prevents the actuator 54 from further closing. This step may include causing the actuator 54 to reverse directions and to open the cover panel 22.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with an example obstacle detection system can likewise be implemented into many other systems to control one or more operations and/or functions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

The system, methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors processor architectures, or combinations of different hardware and software, or any other machine capable of executing program instructions.

Thus, in one aspect, each method described above and combinations thereof may be embodied in computer executable code that, when executing on one or more computing devices performs the steps thereof In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A non-contact obstacle detection system for an opening in a vehicle comprising:

a cover panel slidable in a sliding direction from an open position to a closed position;

a frame defining an opening including a first side edge generally parallel to the sliding direction, and a terminal edge generally transverse to the sliding direction;

wherein the cover panel includes a leading edge abutting the terminal edge with the cover panel in the closed position to completely enclose the opening in the frame, and wherein the leading edge is spaced apart from the terminal edge in the open position;

a first IR-TOF sensor disposed adjacent the terminal edge of the frame and providing a first beam within the opening along and adjacent to the first side edge and reflecting from the leading edge of the cover panel for detecting an obstacle within the opening between the first IR-TOF sensor and the cover panel as the cover panel is moved toward the closed position;

a first controller in communication with the first IR-TOF sensor and configured to detect the obstacle within the opening by sensing an actual length of the first beam.

2. The non-contact obstacle detection system of claim 1, wherein the cover panel includes a pane of glass.

3. The non-contact obstacle detection system of claim 1, wherein the first controller is configured to detect the obstacle within the opening by sensing the actual length of the first beam shorter than an expected length of the first beam.

4. The non-contact obstacle detection system of claim 1, wherein the first controller is configured to calculate an actual closing velocity as a rate of change of the actual length of the first beam over time; and wherein the first controller is configured to detect the obstacle within the opening by sensing the actual closing velocity being less than a predetermined closing velocity.

5. The non-contact obstacle detection system of claim 1, wherein the first controller is configured to calculate an actual closing velocity as a rate of change of the actual length of the first beam over time; and wherein the first controller is configured to detect the obstacle within the opening by sensing a reduction in the actual closing velocity prior to the cover panel being in the closed positon.

6. The non-contact obstacle detection system of claim 1, wherein the first controller is configured to calculate an actual closing velocity as the rate of change of the actual length of the first beam over time; and wherein the first controller is configured to detect the obstacle within the opening by sensing the actual closing velocity being greater than an interruption velocity indicative of a sudden change in the actual length of the first beam caused by the insertion of the obstacle between the first IR-TOF sensor and the cover panel.

7. The non-contact obstacle detection system of claim 1, further including:

a second side edge of the frame parallel and spaced apart from the first side edge;

a second IR-TOF sensor disposed adjacent the terminal edge of the frame and providing a second beam within the frame along and adjacent to the second side edge and reflecting from the leading edge of the cover panel for detecting the obstacle within the opening as the cover panel is moved toward the closed position; and a second controller in communication with the second IR-TOF sensor and configured to detect the obstacle within the opening by sensing an actual length of the second beam.

8. The non-contact obstacle detection system of claim 7, wherein the second controller is configured to calculate an actual closing velocity as the rate of change of the actual length of the second beam over time; and wherein the controller is configured to detect the obstacle within the opening by sensing the actual closing velocity being less than a predetermined closing velocity.

9. The non-contact obstacle detection system of claim 7, wherein the second controller is configured to calculate an actual closing velocity as the rate of change of the actual length of the second beam over time; and wherein the controller is configured to detect the obstacle within the opening by sensing a reduction in the actual closing velocity prior to the cover panel being in the closed positon.

10. The non-contact obstacle detection system of claim 7, wherein the second controller is configured to calculate an actual closing velocity as a rate of change of the actual length of the second beam over time; and wherein the second controller is configured to detect the obstacle within the opening by sensing the actual closing velocity being greater than an interruption velocity indicative of a sudden change in the actual length of the second beam caused by the insertion of the obstacle between the second IR-TOF sensor and the cover panel.

11. The non-contact obstacle detection system of claim 1, further including:

a third IR-TOF sensor disposed adjacent the terminal edge of the frame and providing a third beam within the frame along and adjacent to the terminal edge for detecting an obstacle within the opening as the cover panel is moved toward the closed position; and a third controller in communication with the third IR-TOF sensor and configured to detect an obstacle within the opening by sensing an actual length of the third beam shorter than a predetermined length approximately equal to a length of the terminal edge.

12. The non-contact obstacle detection system of claim 11, wherein the third controller is configured to ignore the actual length of the third beam with the cover panel in a position to block the third beam.

13. The non-contact obstacle detection system of claim 1, further including a contact-type obstacle detection device disposed within the frame and responsive to a contact force indicative of an obstacle within the opening as the cover panel moves toward the closed position.

14. A method for a non-contact obstacle detection system for a cover panel slidable in a sliding direction between an open position and a closed position within a frame of a vehicle, the method comprising the steps of:

detecting the cover panel closing;

generating a first beam parallel to the sliding direction along and adjacent to a first side edge of the frame by a first IR-TOF sensor;

reflecting the first beam off a leading edge of the cover panel and back to the first IR-TOF sensor;

measuring a length of the first beam across the first side edge between the first IR-TOF sensor and the cover panel by the first IR-TOF sensor;

detecting an obstacle within the opening by a first controller using the actual length of the first beam as measured by the first IR-TOF sensor; and signaling by the first controller for an actuator to stop closing the cover panel in response to the detection of an obstacle within the opening.

15. The method for a non-contact obstacle detection system of claim 14, wherein the step of detecting an obstacle within the opening by the first controller using the actual length of the first beam as measured by the first IR-TOF sensor further includes:

calculating an actual closing velocity as a change in the measured length of the first beam over time; and sensing the actual closing velocity being less than an expected closing velocity of the cover panel.

16. The method for a non-contact obstacle detection system of claim 15, wherein the expected closing velocity is static and does not vary.

17. The method for a non-contact obstacle detection system of claim 15, further including:

self-calibrating the non-contact obstacle detection system by updating the expected closing velocity of the cover panel using the actual closing velocity of the cover panel.

18. The method for a non-contact obstacle detection system of claim 14, wherein the step of detecting an obstacle within the opening by the first controller using the actual length of the first beam as measured by the first IR-TOF sensor further includes:

calculating an actual closing velocity as a change in the measured length of the first beam over time; and sensing the actual closing velocity being greater than an interruption velocity indicative of a sudden change in the actual length of the first beam caused by the insertion of the obstacle between the first IR-TOF sensor and the cover panel.

19. The method for a non-contact obstacle detection system of claim 14 wherein the step of detecting an obstacle within the opening by the first controller using the actual length of the first beam as measured by the first IR-TOF sensor further includes:

sensing the actual length of the first beam shorter than an expected length of the first beam.

20. The method for a non-contact obstacle detection system of claim 19, wherein the expected length of the first beam is determined based on an initial position and an expected position resulting from a nominal speed of the cover panel times the amount of time that the cover panel is moved toward the closed position.

* * * * *